(12) United States Patent
Kwon et al.

(10) Patent No.: US 12,710,085 B2
(45) Date of Patent: Aug. 18, 2026

(54) VALVE DEVICE AND SHOCK ABSORBER INCLUDING THE SAME

(71) Applicant: HL Mando Corporation, Pyeongtaek-si (KR)

(72) Inventors: Yonghyun Kwon, Gwangmyeong-si (KR); Insu Park, Seongnam-si (KR); Inyoung Oh, Yongin-si (KR); Chunsung Yu, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 411 days.

(21) Appl. No.: 18/228,119

(22) Filed: Jul. 31, 2023

(65) Prior Publication Data

US 2024/0301936 A1 Sep. 12, 2024

(30) Foreign Application Priority Data

Mar. 6, 2023 (KR) ........................ 10-2023-0029239

(51) Int. Cl.
*F16F 9/516* (2006.01)
*F16F 9/19* (2006.01)
(Continued)

(52) U.S. Cl.
CPC ................ *F16F 9/516* (2013.01); *F16F 9/19* (2013.01); *F16F 9/348* (2013.01); *B60G 13/08* (2013.01);
(Continued)

(58) Field of Classification Search
CPC .... F16F 9/09; F16F 9/348; F16F 9/516; F16F 2222/12; F16F 2228/066; F16F 2230/18;
(Continued)

(56) References Cited

U.S. PATENT DOCUMENTS

2005/0279597 A1* 12/2005 Yamaguchi ............. F16F 9/348
188/322.13
2017/0082169 A1* 3/2017 Kim ...................... F16F 9/3488
(Continued)

FOREIGN PATENT DOCUMENTS

JP 2005-344911 A 12/2005
KR 10-2002-0043858 A 6/2002

OTHER PUBLICATIONS

Office Action issued on May 13, 2026, for corresponding Korean Patent Application No. 10-2023-0029239, along with an English machine translation (15 pages).

*Primary Examiner* — Christopher P Schwartz
(74) *Attorney, Agent, or Firm* — Hauptman Ham, LLP

(57) ABSTRACT

The present disclosure relates to a valve device and a shock absorber including same. The valve device for controlling a damping force, which is disposed, on one side of a piston having a passage through which fluid moves, inside a shock absorber, includes: a rebound retainer disposed on the one side of the piston and including a first rebound retainer chamber concavely formed in an annular shape to allow a portion of fluid passing through the passage to be stored, and a retainer hole formed in the first rebound retainer chamber; and a first disk for guiding fluid passing through the retainer hole to move through a slit formed in an outer circumferential surface thereof.

20 Claims, 11 Drawing Sheets

(51) Int. Cl.
*F16F 9/348* (2006.01)
*B60G 13/08* (2006.01)
*B60G 17/08* (2006.01)

(52) U.S. Cl.
CPC .......... *B60G 17/08* (2013.01); *B60G 2202/24* (2013.01); *B60G 2204/62* (2013.01); *B60G 2206/41* (2013.01); *B60G 2500/11* (2013.01); *B60G 2600/21* (2013.01); *B60G 2800/162* (2013.01); *B60G 2800/916* (2013.01); *F16F 2222/12* (2013.01); *F16F 2228/066* (2013.01); *F16F 2230/18* (2013.01)

(58) Field of Classification Search
CPC .... B60G 13/08; B60G 17/08; B60G 2202/24; B60G 2206/41; B60G 2500/11; B60G 2600/21; B60G 2800/162; B60G 2800/916
USPC ......... 188/280, 282.5, 282.6, 322.13, 322.15
See application file for complete search history.

(56) References Cited

U.S. PATENT DOCUMENTS

2020/0032872 A1* 1/2020 Kadokura ............. F16F 9/5123
2022/0099153 A1* 3/2022 Yuno ....................... F16F 9/348

* cited by examiner

VALVE DEVICE AND SHOCK ABSORBER INCLUDING THE SAME

CROSS REFERENCE TO RELATED APPLICATION

The present application claims priority to and the benefit of Korean Patent Application No. 10-2023-0029239, filed Mar. 6, 2023, in the Korean Intellectual Property Office, the entire disclosure of which is incorporated herein by reference for all purposes.

TECHNICAL FIELD

The present disclosure relates to a valve device and a shock absorber including the same, and more particularly, to a valve device installed in a vehicle and a shock absorber including the same.

BACKGROUND

In general, a shock absorber stores a fluid therein and generates a damping force by the fluid when the fluid is compressed or rebounded. In addition, such a shock absorber is installed in a vehicle or the like to reduce an external shock and transmit it to a driver or passenger.

A rebound valve and a compression valve are installed in the shock absorber, and are opened and closed by the fluid passing through a passage formed inside a piston to form a damping force.

However, since the damping force is formed according to the opening and closing of the rebound valve and the compression valve, it is difficult to tune the damping force when the piston moves at an extremely low speed or at a high speed.

That is, there is a difficulty in manufacturing a shock absorber that satisfies a damping force desired by a driver when the piston moves at the extremely low speed during a rebound stroke.

SUMMARY

In view of the above, the present disclosure provides a valve device with a large degree of freedom in tuning a damping force depending on a speed range according to movement of a piston, and a shock absorber including the same.

In accordance with an embodiment of the present disclosure, a valve device for controlling a damping force, which is disposed, on one side of a piston having a passage through which fluid moves, inside a shock absorber, includes: a rebound retainer disposed on the one side of the piston and including a first rebound retainer chamber concavely formed in an annular shape to allow a portion of fluid passing through the passage to be stored, and a retainer hole formed in the first rebound retainer chamber; and a first disk for guiding fluid passing through the retainer hole to move through a slit formed in an outer circumferential surface thereof.

The rebound retainer may further include: a first protrusion that contacts a portion of the first disk adjacent to a central portion of the first disk; a second protrusion that contacts a portion of an outer peripheral portion of the first disk; and a second rebound retainer chamber concavely formed between the first protrusion and the second protrusion and communicating with the retainer hole.

The second protrusion may be formed to have a larger length in a direction away from the piston than the first protrusion.

The rebound retainer may further include a third rebound retainer chamber, for storing fluid passing through the slit, spaced apart from the second rebound retainer chamber around the second protrusion.

The valve device may further include: a second disk for guiding fluid stored in the second rebound retainer chamber to move to the third rebound retainer chamber.

The valve device may further include: a rebound valve that is opened and closed by a pressure of the fluid passing through the passage to form a damping force.

The rebound retainer may further include a third protrusion that protrudes to contact a portion of the rebound valve on one side of the third rebound retainer chamber.

During a rebound stroke of the piston, the fluid passing through the retainer hole may form a damping force while passing between the rebound retainer and the first disk.

Alternatively, during the rebound stroke of the piston, the fluid passing through the retainer hole may form a damping force while passing though the slit.

In accordance with an embodiment of the present disclosure, a shock absorber include: a body in which fluid is stored; a piston disposed inside the body to form a compression chamber on one side and a rebound chamber on the other side, and having a rebound passage and a compression passage through which the compression chamber and the rebound chamber communicate with each other; a damping force adjusting unit, disposed on one side of the piston, for adjusting a damping force of the fluid passing through the rebound passage; a rebound valve that contacts at least a portion of the damping force adjusting unit, the rebound valve being opened and closed by a pressure of the fluid passing through the rebound passage to forming a damping force; and a compression valve disposed on the other side of the piston, the compression valve being opened and closed by a pressure of the fluid passing through the compression passage to forming a damping force.

The piston may include: a first piston chamber formed to store the fluid passing through the compression passage in a region facing the compression valve on the other side of the piston; and a second piston chamber formed to store the fluid passing through the rebound passage in a region facing the damping force adjusting unit on one side of the piston, the second piston chamber having a larger volume than that of the first piston chamber.

The damping force adjusting unit may include a rebound retainer including a first rebound retainer chamber disposed on one side of the piston and formed concavely in an annular shape to store a part of the fluid passing through the second piston chamber, and a retainer hole formed in the first rebound retainer chamber.

The damping force adjusting unit may further include a first disk for guiding the fluid passing through the retainer hole to move to a slit formed in an outer circumferential surface of the first disk.

The rebound retainer may further include: a first protrusion that contacts a portion of the first disk adjacent to a central portion of the first disk; a second protrusion that contacts a portion of an outer peripheral portion of the first disk; a second rebound retainer chamber concavely formed between the first protrusion and the second protrusion and communicating with the retainer hole; a third rebound retainer chamber in which fluid passing through the slit is stored; and a third protrusion that protrudes to contact a portion of the rebound valve on one side of the third rebound retainer chamber.

The damping force adjusting unit may further include: a second disk for guiding the fluid passing through the slit to move to the third rebound retainer chamber; and a retainer disposed between the second disk and the rebound valve.

The first disk, the second disk, and the retainer may be disposed between the first projection and the third projection.

The first disk and the rebound retainer may adjust damping forces in different speed ranges depending on a moving speed of the piston.

The rebound passage of the piston may include a plurality of rebound passages, and the piston may further include a rebound bridge that is formed between the plurality of rebound passages, is inclined toward a center of the piston, at least partially faces the first rebound retainer chamber, and forms a part of the second piston chamber.

A region of the second piston chamber communicating with the rebound passage may be inclined so that the fluid passing through the rebound passage flows into the second piston chamber.

According to the embodiment of the present disclosure, the valve device and the shock absorber including the same can effectively tune the damping force depending on the speed range according to the movement of the piston.

That is, the damping force provided depending on the moving speed range of the piston can be effectively tuned when the shock absorber is manufactured.

DETAILED DESCRIPTION

Figure 1:
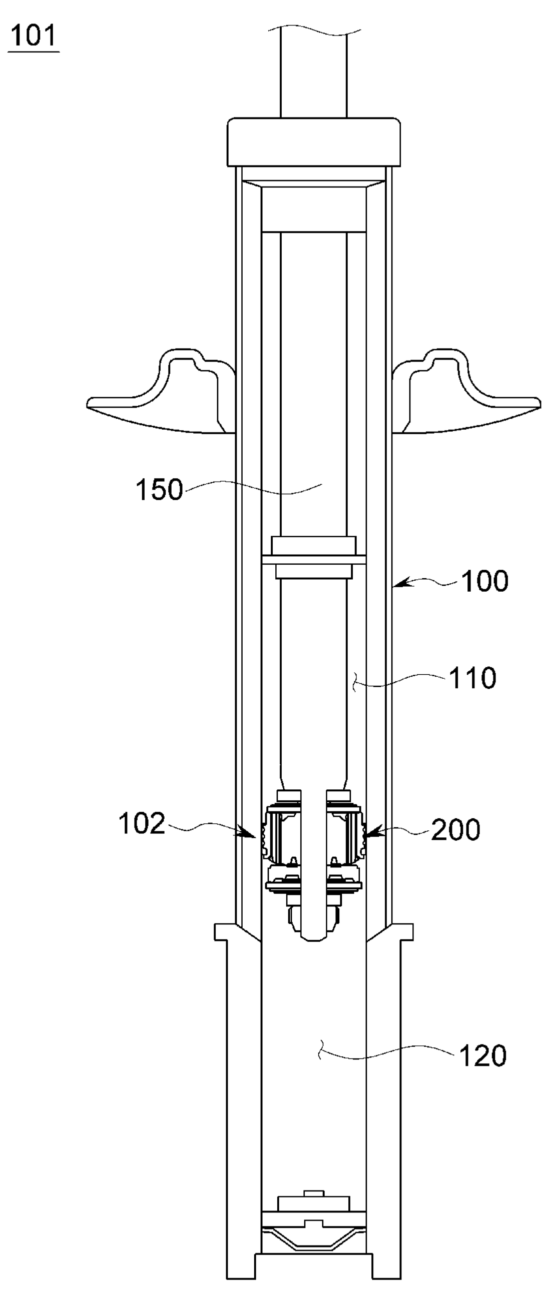
FIG. 1 shows a shock absorber in which a valve device according to one embodiment of the present disclosure is installed.

Hereinafter, with reference to the accompanying drawings, embodiments of the present disclosure will be described in detail so that those skilled in the art can easily carry out the present disclosure. The present disclosure may be embodied in various different forms and is not limited to the embodiments set forth herein.

It is noted that the drawings are schematic and not drawn to scale. Relative dimensions and proportions of parts in the drawings are shown exaggerated or reduced in size for clarity and convenience in the drawings, and the dimensions are illustrative only and not limiting. In addition, like reference numerals are used to designate similar features in the same structural elements or parts appearing in two or more drawings.

The embodiments of the present disclosure specifically represent ideal embodiments of the present disclosure. Therefore, various variations of the diagram are expected. Accordingly, the present disclosure is not limited to the specific shape of the illustrated area, and includes, for example, modification of the shape by manufacturing.

Hereinafter, referring to FIGS. 1 to 11, a valve device 102 according to one embodiment of the present disclosure will be described.

Figure 2:
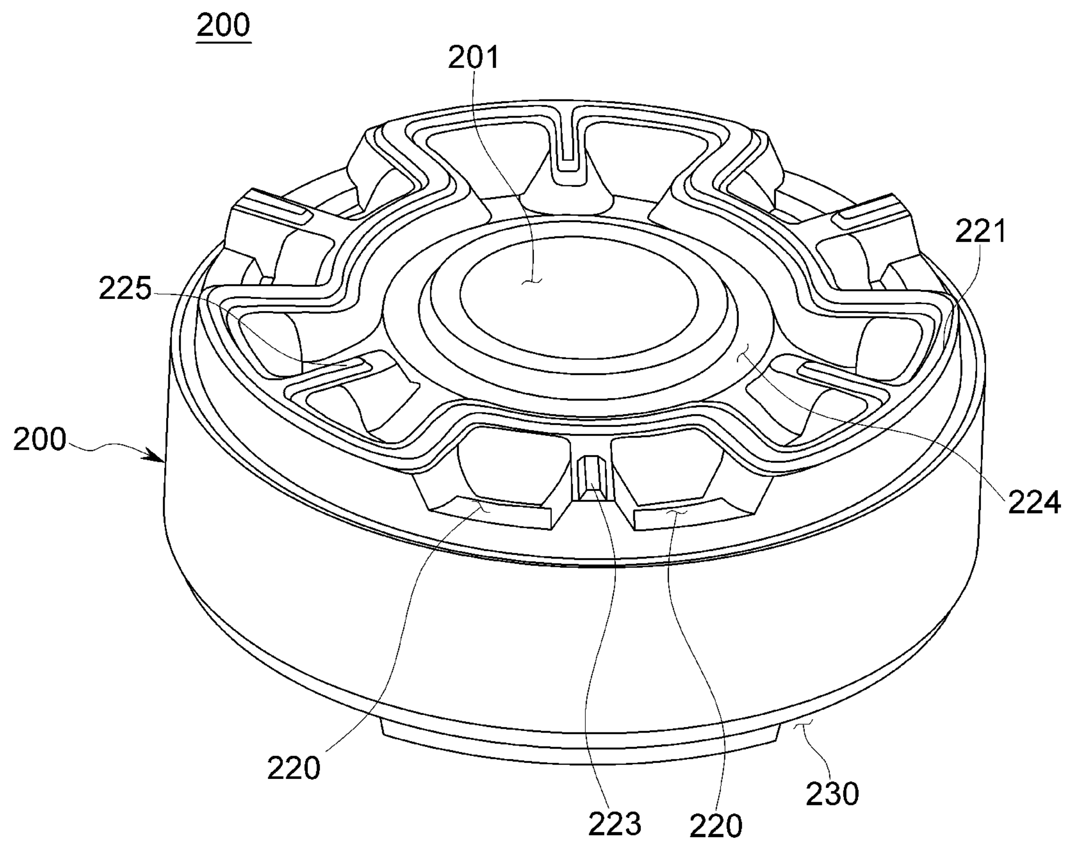
FIG. 2 is a view showing the other side of a piston according to one embodiment of the present disclosure.
Figure 3:
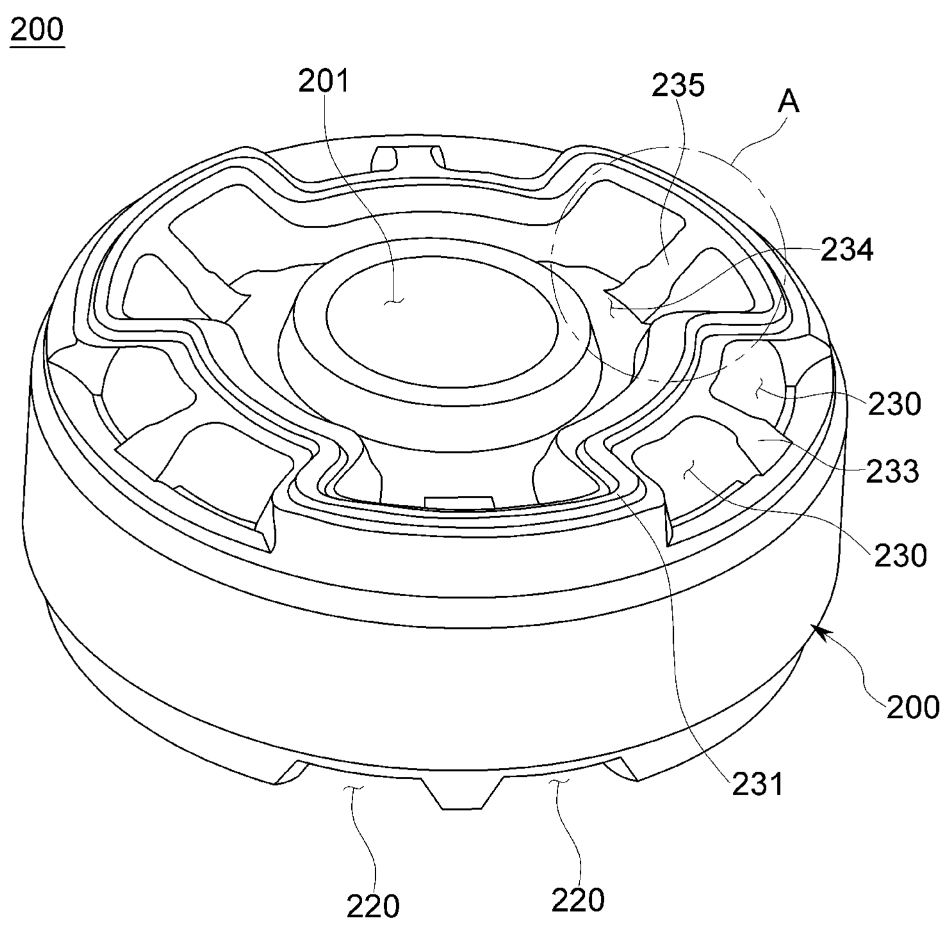
FIG. 3 is a view showing one side of the piston according to one embodiment of the present disclosure.

As shown in FIG. 1, the valve device 102 is disposed on one side of a piston 200 to control a damping force of a shock absorber 101. Specifically, as shown in FIGS. 2 to 3, the piston 200 is formed with a plurality of flow passages 220 and 230.

Figure 5:
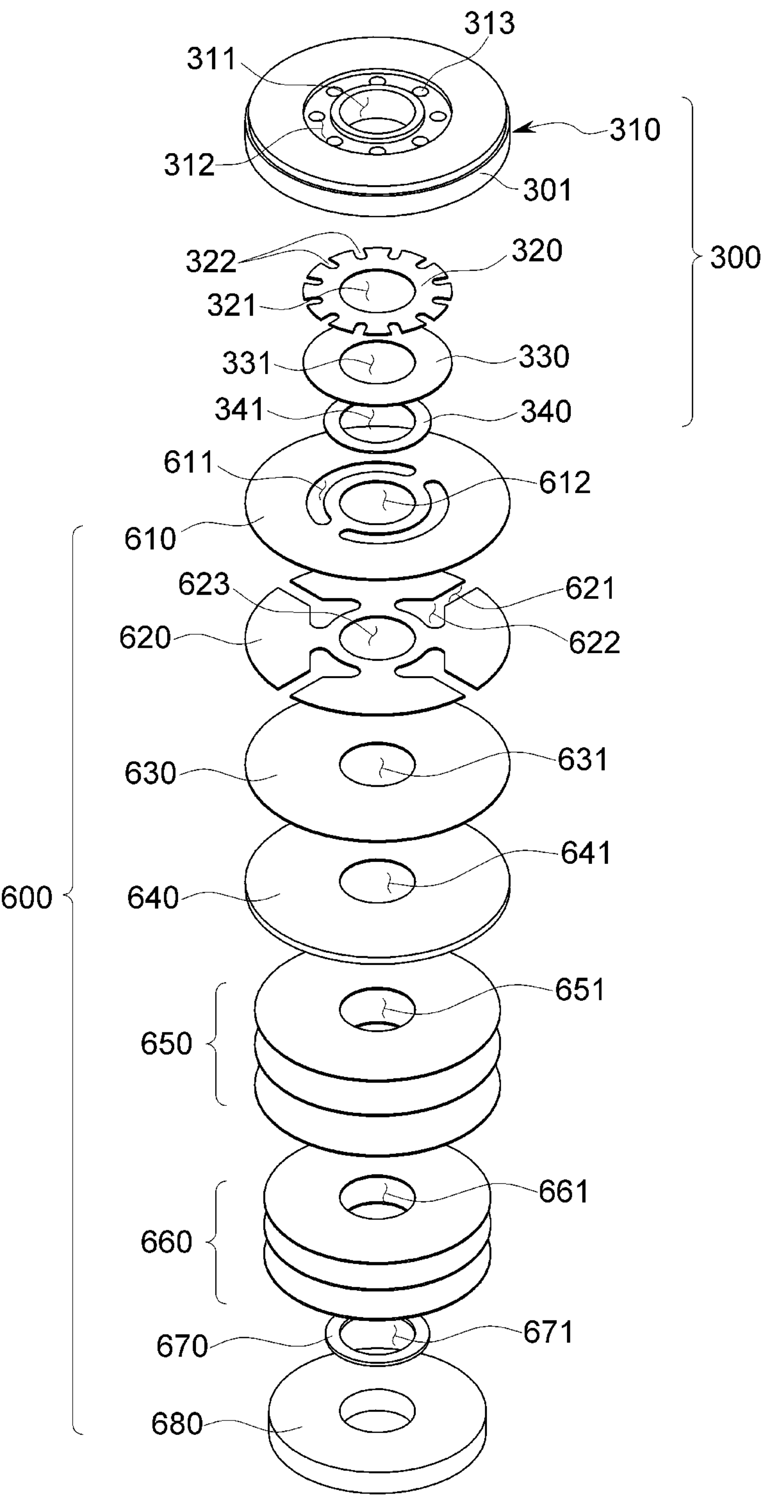
FIG. 5 is a diagram illustrating a damping control unit and a rebound valve according to one embodiment of the present disclosure.
Figure 8:
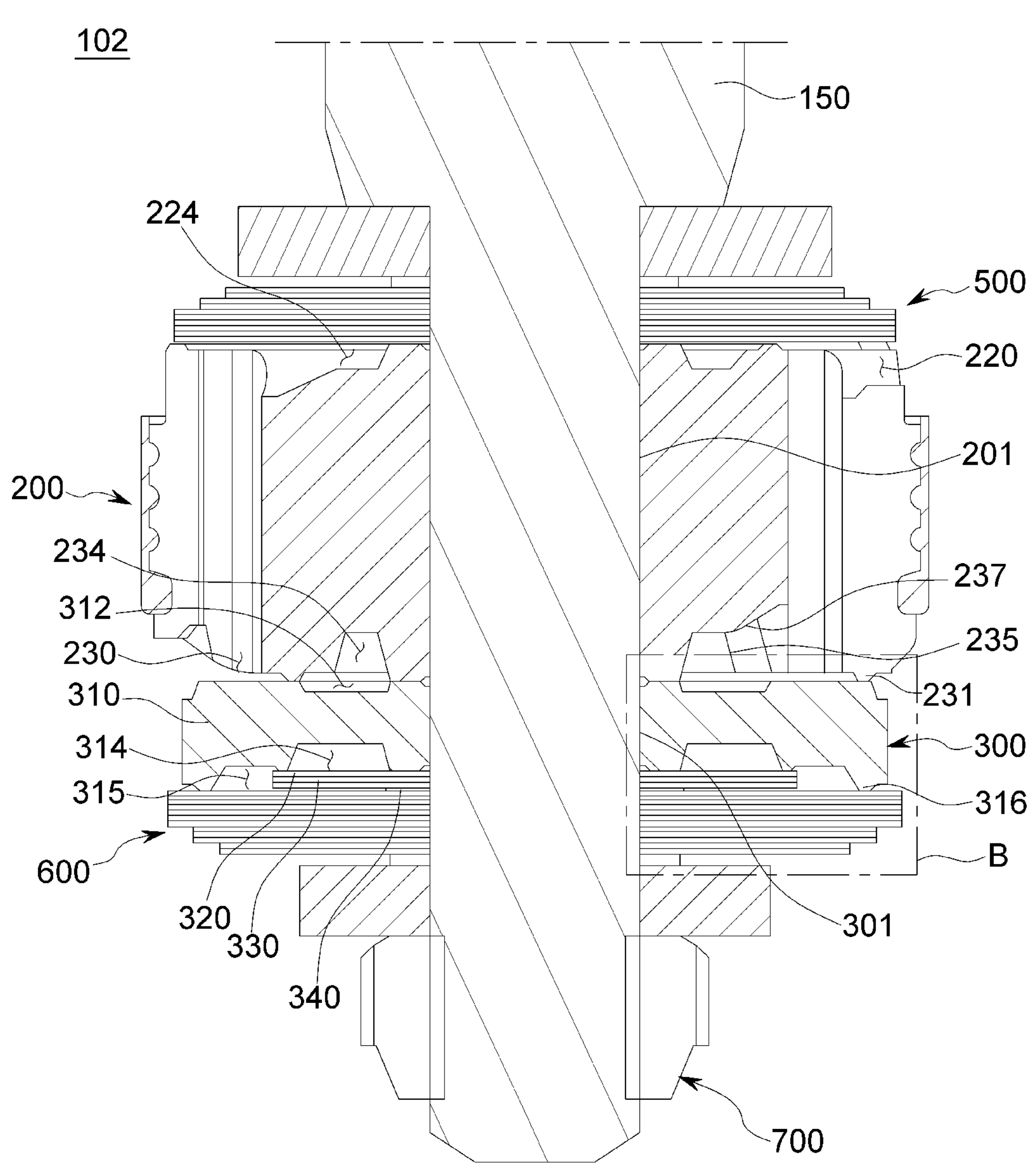
FIG. 8 shows the valve device according to one embodiment of the present disclosure.
Figure 9:
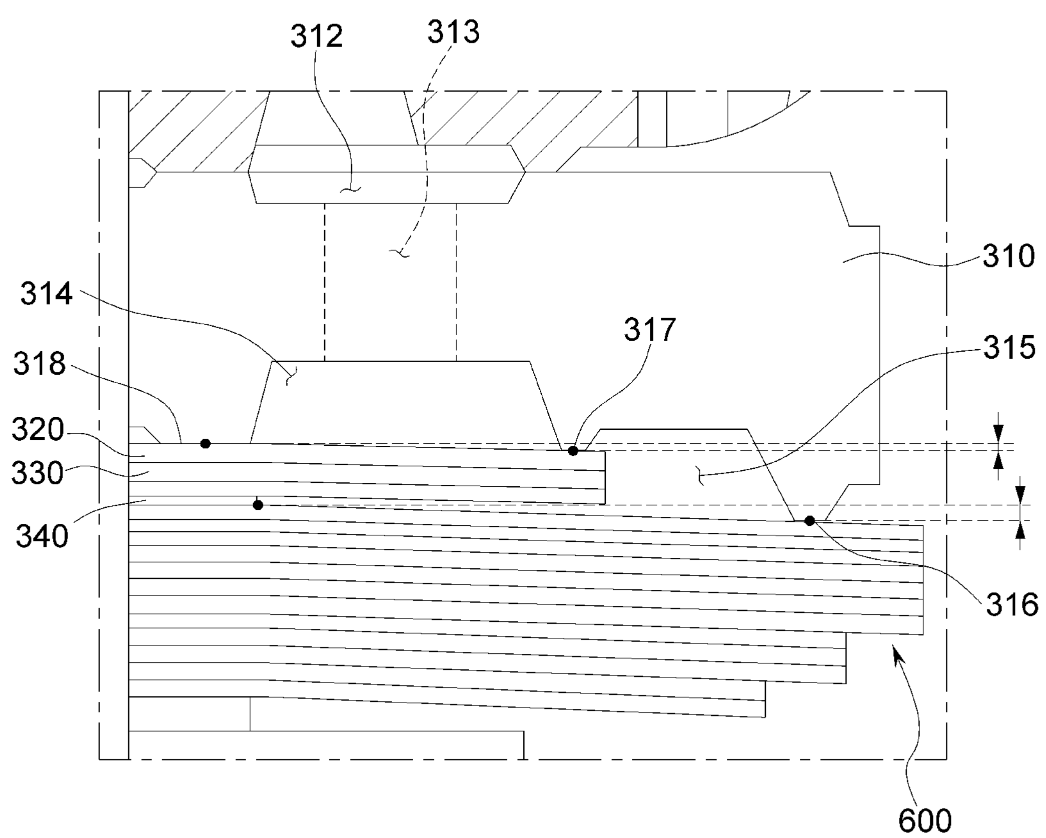
FIG. 9 is an enlarged view of area B of FIG. 8.

As shown in FIGS. 5, 8 and 9, the valve device 102 according to one embodiment of the present disclosure includes a rebound retainer 310 and a first disk 320.

The rebound retainer 310 is disposed on one side of the piston 200 as shown in FIGS. 5, 8 and 9. In addition, the rebound retainer 310 includes a first rebound retainer chamber 312 and a retainer hole 313.

The first rebound retainer chamber 312 is concavely formed in an annular shape. Specifically, the first rebound retainer chamber 312 is concavely formed in a direction away from one side of the piston 200 to form a space in which fluid passing through the passage 220 can be stored.

In addition, the retainer hole 313 is extended through the first rebound retainer chamber 312. Specifically, a plurality of the retainer holes 313 may be formed to be spaced apart from each other along the annular first rebound retainer chamber 312.

That is, the fluid stored in the first rebound retainer chamber 312 may pass through the retainer hole 313.

As shown in FIGS. 5, 8, and 9, the first disk 320 may guide the fluid passing through the retainer hole 313 to move through a slit 322 formed on an outer circumferential surface thereof. Specifically, the slit 322 may be formed in the first disk 320 in such a way that a region of the outer circumferential surface is concave toward the center of the first disk 320. The fluid can be moved through the slit 322.

As an example, a plurality of slits 322 may be spaced apart from each other along the outer circumferential direction of the first disk 320. In addition, an installation hole 321 into which one side of a piston rod 150 can be inserted may be formed in the first disk 320.

Accordingly, the valve device 102 according to one embodiment of the present disclosure can adjust the damping force by the rebound retainer 310 and the first disk 320.

Specifically, the fluid that has passed through the passage 220 is stored in the first rebound retainer chamber 312 and may form a damping force while moving through the slit 322. That is, the damping force by the fluid passing through the slit 322 may form a small damping force when the speed of the piston 200 is extremely low.

For example, the fluid passing through the passage 220 may form a damping force while passing through the first rebound retainer chamber 312 and the slit 322.

In addition, as shown in FIGS. 5, 8, and 9, the rebound retainer 310 according to one embodiment of the present disclosure may include a first protrusion 318, a second protrusion 317, and a second rebound retainer chamber 314.

The first protrusion 318 protrudes to contact a region adjacent to the center of the first disk 320. Specifically, the rebound retainer 310 includes a retainer body 301. The retainer body 301 may be formed to have an approximately circular cross section. A retainer installation hole 311 through which the piston rod 150 of the shock absorber 101 can be inserted may be formed at the center of the retainer body 301.

The first protrusion 318 may protrude in a direction toward the first disk 320. Specifically, the first protrusion 318 may protrude from a region of the retainer body 301 that is relatively closer to the retainer installation hole 311 than the outer circumferential surface of the first disk 320.

The second protrusion 317 may be formed on the retainer body 301 to be spaced apart from the first protrusion 318. Further, the second protrusion 317 may contact a region of an outer peripheral portion of the first disk 320. In addition, the second protrusion 317 may be disposed relatively farther from the retainer installation hole 311 than the first protrusion 318.

The second rebound retainer chamber 314 may be formed by depressing a region of the retainer body 301 between the first protrusion 318 and the second protrusion 317 in a direction toward the piston 200. Specifically, the second rebound retainer chamber 314 may store fluid passing through the retainer hole 313. Further, the second rebound retainer chamber 314 may be formed in an annular shape.

As an example, the first protrusion 318 and the second protrusion 317 may be formed along the circumferential direction of the retainer body 301. Alternatively, a plurality of the second protrusions 317 may be arranged to be spaced apart along the circumferential direction of the retainer body 301.

Accordingly, the rebound retainer 310 stores a certain amount of fluid introduced into the rebound retainer 310 through the passage 220 of the piston 200 and allows the fluid to form pressure.

A damping force by the fluid stored in the second rebound retainer chamber 314 may be formed.

In addition, as shown in FIG. 9, the second protrusion 317 according to one embodiment of the present disclosure may protrude to have a larger height.

The second protrusion 317 may protrude toward the first disk 320 at a relatively lager height than the first protrusion 318. Specifically, the second protrusion 317 may have a relatively longer protrusion length in a direction away from the piston 200 than the first protrusion 318.

Accordingly, since the second protrusion 317 acts to press the first disk 320 with a greater force than the first protrusion 318, the second protrusion 317 may apply a preload on the first disk 320. That is, the force acting on a portion of the first disk 320 which contacts the first protrusion 318 may be relatively smaller than the force acting on a portion of the first disk 320 which contacts the second protrusion 317.

As an example, the first disk 320 may have an outer diameter relatively larger than an inner diameter of the second protrusion 317.

In addition, as shown in FIG. 9, the rebound retainer 310 according to one embodiment of the present disclosure may further include a third rebound retainer chamber 315.

The third rebound retainer chamber 315 may be spaced apart from the second rebound retainer chamber 314 around the second protrusion 317. Further, the third rebound retainer chamber 315 may be concavely formed toward the piston 200.

In addition, the fluid passing through the slit 322 may be stored in the third rebound retainer chamber 315. That is, the fluid that has passed through the slit 322 is stored in the third rebound retainer chamber 315 and may form a damping force.

In addition, the valve device 102 according to one embodiment of the present disclosure, as shown in FIGS. 5 and 9, may further include a second disk 330.

The second disk 330 may allow the fluid stored in the second rebound retainer chamber 314 to move to the third rebound retainer chamber 315.

Specifically, the fluid passing between the outer circumferential surface of the first disk 320 on which the slit 322 is formed and the second disk 330 may flow into the third rebound retainer chamber 315 to be stored therein.

That is, a pressure of the fluid stored in the second rebound retainer chamber 314 increases to the extent that not only the slit 322 but also a gap between the first disk 320 and the second disk 330 open. In this case, the fluid passing through the second rebound retainer chamber 314 may move to the third rebound retainer chamber 315.

As an example, an installation opening 331 into which one side of the piston rod 150 can be inserted may be formed at the center of the second disk 330.

Accordingly, the rebound retainer 310 has a plurality of chambers capable of storing fluid that has passed through the retainer hole 313, so that damping force can be effectively formed.

In addition, as shown in FIGS. 5, 8 and 9, the valve device 102 according to one embodiment of the present disclosure may further include a rebound valve 600.

The rebound valve 600 is opened and closed by the pressure of the fluid passing through the passage 220 to form a damping force. Specifically, the rebound valve 600 may be spaced apart from the piston 200 with a damping force adjusting unit 300 including the rebound retainer 310 and the first disk 320 therebetween.

During the rebound stroke of the piston 200, the rebound valve 600 opens and closes depending on the pressure of the fluid flowing into the passage 220 of the piston 200 to form a damping force.

Accordingly, the valve device 102 of the present disclosure can adjust the damping force depending on the moving speed of the piston 200 through the damping force adjusting unit 300 and form a damping force through the rebound valve 600.

In addition, the rebound retainer 310 according to one embodiment of the present disclosure may further include a third protrusion 316 as shown in FIGS. 5, 8, and 9.

The third protrusion 316 may protrude from the retainer body 301. Further, the third protrusion 316 may be provided on one side of the third rebound retainer chamber 315 so that a protruding surface thereof defines the third rebound retainer chamber 315.

In addition, the third protrusion 316 may contact a portion of the rebound valve 600. Specifically, the third protrusion 316 may be disposed relatively closer to the second protrusion 317 than the first protrusion 318.

The third protrusion 316 contacts a portion of the rebound valve 600 to apply a preload thereto.

Specifically, the first disk 320 and the second disk 330 may be disposed within an inner diameter range from the center of the retainer body 301 to the third protrusion 316. That is, outer diameters of the first disk 320 and the second disk 330 may be formed to be smaller than an inner diameter of the third protrusion 316 or an outer diameter of the third rebound retainer chamber 315.

In addition, the first disk 320 and the second disk 330 may be disposed within a range between a height of the first protrusion 318 and a height of the third protrusion 316.

Accordingly, the third protrusion 316 may press a portion of the rebound valve 600 to apply a preload thereon, and may define the third rebound retainer chamber 315 to form a damping force.

Further, during the rebound stroke of the piston 200 according to the present disclosure, the fluid passing through the retainer hole 313 may form a damping force while passing between the rebound retainer 310 and the first disk 320.

During the rebound stroke of the piston 200, the fluid passing through the retainer hole 313 may form a damping force while passing between the rebound retainer 310 and the first disk 320.

That is, while the piston 200 moves at a high speed during the rebound stroke of the piston 200, when a fluid with a high pressure and a large flow rate flows in through the passage 220, the fluid passing through the retainer hole 313 of the rebound retainer 310 may move after releasing the contact between the second protrusion 317 and the first disk 320 and the contact between the third protrusion 316 and the rebound valve 600.

In other words, at this time, the fluid may pass through the second rebound retainer chamber 314 and the third rebound retainer chamber 315 to form a damping force.

In addition, during the rebound stroke of the piston 200 according to the present disclosure, the fluid passing through the retainer hole 313 may form a damping force while pass through the slit 322.

During the rebound stroke of the piston 200, the fluid passing through the retainer hole 313 is stored in the second rebound retainer chamber 314 and can form a damping force while moving to the third rebound retainer chamber 315 through the slit 322.

That is, while the piston 200 moves at an extremely low speed during the rebound stroke of the piston 200, the fluid passing through the retainer hole 313 at a small flow rate and hydraulic pressure is stored in the first rebound retainer chamber 312, and the fluid can form a damping force while moving to the third rebound retainer chamber 315 through the slit 322.

Accordingly, when the valve device 102 or the shock absorber 101 is manufactured, the amount of damping when the piston 200 moves at an extremely low speed can be increased or decreased depending on an area of the slit 322 of the first disk 320.

In addition, as shown in FIG. 9, the third protrusion 316 according to one embodiment of the present disclosure may protrude longer than the second protrusion 317 in the direction away from the piston 200.

The third protrusion 316 may be a part of the rebound retainer 310 disposed farthest from the piston 200.

Therefore, the third protrusion 316 may define an installation space for the first disk 320 and the second disk 330, and the third rebound retainer chamber 315 by the inner circumferential surface thereof, and effectively press a portion of the rebound valve 600.

In addition, the damping force adjusting unit 300 according to one embodiment of the present disclosure may further include a retainer 340 as shown in FIG. 5.

An outer diameter of the retainer 340 may be formed to be smaller than the inner diameter of the second protrusion 317. Further, the retainer 340 may be disposed between the second disk 330 and the rebound valve 600. That is, in the third protrusion 316, a height difference is generated between one surface of the retainer 340 and the third protrusion 316, and through such a height difference, the third protrusion 316 press a portion of the rebound valve 600 to provide a preload.

As an example, an installation hole 341 through which one side of the piston rod 150 can pass may be formed in the center of the retainer 340.

Hereinafter, a shock absorber 101 according to one embodiment of the present disclosure will be described with reference to FIGS. 1 to 11.

The shock absorber 101 have a fluid stored therein, and may form a damping force by a piston 200 compressed or rebounded therein.

The shock absorber 101 according to one embodiment of the present disclosure may include a body 100, a piston 200, a damping force adjusting unit 300, a rebound valve 600, and a compression valve 500.

The body 100 has a hollow interior in which a portion of the fluid is stored. Specifically, the body 100 is extended in one direction.

The piston 200 is disposed inside the body 100, and partitions a compression chamber 120 and a rebound chamber 110. In addition, the compression chamber 120 is disposed on one side of the piston 200, and the rebound chamber 110 is disposed on the other side of the piston 200. In addition, a rebound passage 220 and a compression passage 230 are formed in the piston 200 to allow fluid to move between the compression chamber 120 and the rebound chamber 110.

Specifically, the rebound passage 220 may guide the fluid remaining in the rebound chamber 110 to flow into the compression chamber 120 during a rebound stroke of the piston 200.

The compression passage 230 may guide the fluid remaining in the compression chamber 110 to flow into the rebound chamber 110 during a compression stroke of the piston 200.

The damping force adjusting unit 300 is disposed on one side of the piston 200. In addition, the damping force adjusting unit 300 adjusts a damping force of the fluid passing through the rebound passage 220. Specifically, the damping force adjusting unit 300 may adjust the damping force of the fluid passing through the rebound passage 220 depending on the moving speed of the piston 200.

The rebound valve 600 may contact at least a portion of the damping force adjusting unit 300. In addition, the rebound valve 600 is opened and closed by the pressure of the fluid passing through the rebound passage 220 to form a damping force. That is, the damping force adjusting unit 300 can adjust the damping force in an extremely low speed range of the piston 200 or the damping force in a high speed range of the piston 200 that the rebound valve 600 cannot control.

The compression valve 500 is disposed on the other side of the piston 200. In addition, the compression valve 500 is opened and closed by the pressure of the fluid passing through the compression passage 230 to form a damping force.

With such configurations, the shock absorber 101 according to one embodiment of the present disclosure includes the damping force adjusting unit 300 between the piston 200 and the rebound valve 600, so that during the rebound stroke of the piston 200, the range of damping force can be effectively adjusted.

In addition, in the shock absorber 101 according to one embodiment of the present disclosure, the damping force adjusting unit 300 and the rebound valve 600 may be disposed on one side of the piston 200, and the compression valve 500 may be disposed on the other side of the piston 200.

Accordingly, the shock absorber 101 according to one embodiment of the present disclosure can adjust the damping force during the rebound stroke of the piston 200 by the damping force adjusting unit 300.

Figure 4:
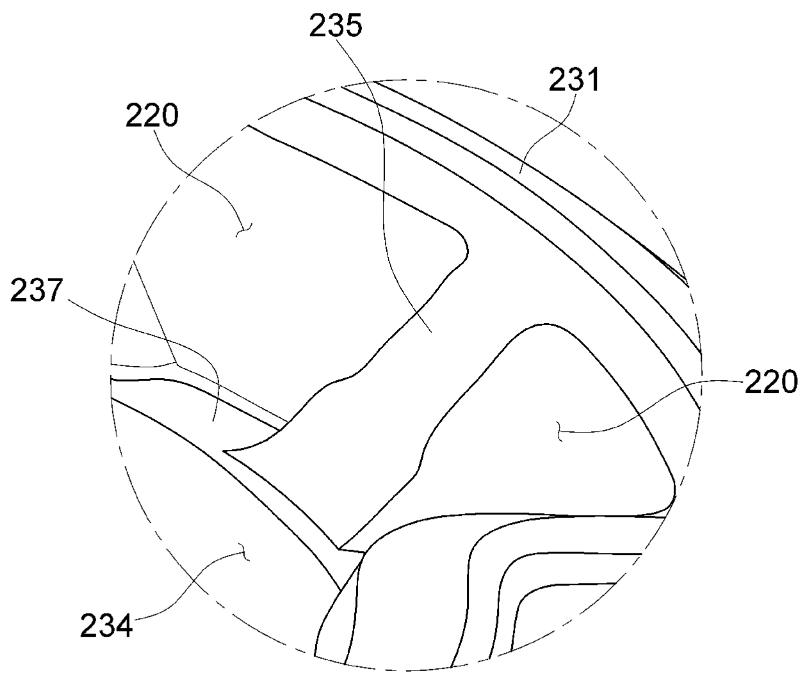
FIG. 4 is an enlarged view of area A of FIG. 3.

In addition, the piston 200 according to one embodiment of the present disclosure may include a first piston chamber 224 and a second piston chamber 234, as shown in FIGS. 2 to 4.

The first piston chamber 224 may be formed such that fluid is stored in an area facing the compression valve 500 after passing through the compression passage 230 on the other side of the piston 200.

Specifically, the first piston chamber 224 may form a space in which a fluid for opening the compression valve 500 is stored and passed on the other side of the piston body 210. A piston installation hole 201 into which the piston rod 150 can be inserted may be formed through the center of the piston body 210. In addition, the first piston chamber 224 may be concavely formed on the other side of the piston body 210 along the circumferential direction. Further, the first piston chamber 224 may be formed to communicate with the compression passage 230.

A portion of the compression valve 500 may come into contact with a first partition rib 221 formed in the first piston chamber 224. Specifically, the first partition rib 221 may partition the compression passage 230 and the rebound passage 220 formed through the piston 200 from each other. That is, the first partition rib 221 may allow the compression passage 230 and the first piston chamber 224 to define a space in which fluid is stored.

The second piston chamber 234 may be formed such that fluid is stored in an area facing the damping force adjusting unit 300 after passing through the rebound passage 220 on one side of the piston 200. Further, the second piston chamber 234 may be formed to have a larger volume than that of the first piston chamber 224.

Specifically, the second piston chamber 234 may form a space in which fluid to be supplied to the damping force adjusting unit 300 is stored and passed on one side of the piston body 210. In addition, the first piston chamber 224 may be concavely formed on one side of the piston body 210 along the circumferential direction. Further, the second piston chamber 234 may be formed to communicate with the rebound passage 220.

A portion of the damping force adjuster 300 may come into contact with a second partition rib 231 formed in the second piston chamber 234. Specifically, the second partition rib 231 may partition the compression passage 230 and the rebound passage 220 formed through the piston 200 from each other. That is, the second partition rib 231 may allow the rebound passage 220 and the second piston chamber 234 to form a space in which fluid is stored.

As shown in FIGS. 2, 3 and 8, the second piston chamber 234 is formed to have a depth greater than that of the first piston chamber 224 to secure a more fluid storage and passing space.

As an example, a portion of a side surface, on the other side, of the piston body 210 is opened so that fluid may be introduced from the rebound chamber 110 into one end of the rebound passage 220. The fluid introduced into one end of the rebound passage 220 may not be moved to the compression passage 230 by the first partition rib 221. Further, the other end of the rebound passage 220 may communicate with the second piston chamber 234.

A portion of a side surface, one side, of the piston body 210 is opened so that fluid may be introduced from the compression chamber 120 into one end of the compression passage 230. The fluid introduced into one end of the compression passage 230 may not be moved to the rebound passage 220 by the second partition rib 231. Further, the other end of the compression passage 230 may communicate with the first piston chamber 224.

In addition, the damping force adjusting unit 300 according to one embodiment of the present disclosure may include the rebound retainer 310 as shown in FIG. 5.

As shown in FIGS. 5, 8, and 9, the rebound retainer 310 is disposed on one side of the piston 200 and may be concavely formed in an annular shape so that a portion of the fluid passing through the second piston chamber 234 can be stored. Specifically, the first rebound retainer chamber 312 and the second piston chamber 234 may be disposed to at least partially face each other.

Further, a retainer hole 313 may be formed through the first rebound retainer chamber 312. Specifically, a plurality of the retainer holes 313 may be spaced apart from each other along the first rebound retainer chamber 312.

The rebound retainer 310 of the shock absorber 101 according to one embodiment of the present disclosure may be the same as the rebound retainer 310 of the valve device 102 according to one embodiment of the present disclosure described above.

In addition, as shown in FIGS. 8 and 9, the first disk 320, the second disk 330, and the retainer 340 of the shock absorber 101 according to one embodiment of the present disclosure may be disposed along the height direction of the third protrusion 316.

The first disk 320, the second disk 330, and the retainer 340 may be disposed between one end of the first protrusion 318 and one end of the third protrusion 316.

That is, the first disk 320, the second disk 330, and the retainer 340 may be disposed at an inner side of the third protrusion 316.

The first disk 320, the second disk 330, and the retainer 340 may be opened and closed by the pressure of the fluid stored in the first rebound retainer chamber 312 or the second rebound retainer chamber 314.

In addition, the piston 200 according to one embodiment of the present disclosure may further include a rebound bridge 235, as shown in FIGS. 3, 4 and 8.

The rebound passage 220 may include a plurality of rebound passages 220. Specifically, two rebound passages 220 may be spaced apart from each other on one side of the piston body 210 with the rebound bridge 235 therebetween. A pair of rebound passages 220 spaced apart from each other with the rebound bridge 235 therebetween forms a group, and a plurality of pairs of rebound passages 220 forming one group may be arranged on the piston body 210 at a certain angle.

In addition, the rebound bridge 235 may be inclined in a direction closer to the second piston chamber 234 as it goes toward the center of the piston 200. That is, since the rebound bridge 235 is formed to be inclined, the fluid can be more stored as much as the inclination of the rebound bridge 235, so that the volume of the second piston chamber 234 can be increased.

At least a portion of the rebound bridge 235 may face the first rebound retainer chamber 312 formed in the rebound retainer 310. That is, a pressure chamber is formed for the fluid in the space between the second piston chamber 234 and the first rebound retainer chamber 312, and the fluid introduced from the rebound passage 220 can form a pressure while passing through the retainer hole 313.

In addition, the piston 200 according to one embodiment of the present disclosure may further include a compression auxiliary bridge 233, as shown in FIG. 3.

The compression auxiliary bridge 233 may be formed between the plurality of compression passages 230 formed on one side of the piston body 210.

The compression auxiliary bridge 233 may guide the inflow of fluid flowing into the compression passage 230. Specifically, the compression auxiliary bridge 233 may have one end connected to the second partition rib 231 and the other end connected to the side surface of the piston body 210. In addition, the compression auxiliary bridge 233 may be formed with an inclined and/or curved surface. In addition, the compression auxiliary bridge 233 may be formed farther away in the height direction of the piston body 210 as it goes from the other end to one end.

In other words, by the compression auxiliary bridge 233, the fluid can be evenly introduced into the compression passage 230 along the circumferential direction of the piston body 210.

In addition, the piston 200 according to one embodiment of the present disclosure may further include a compression bridge 225, as shown in FIG. 2.

The compression passage 230 may include a plurality of compression passages 230. Specifically, two compression passages 230 may be spaced apart from each other on the other side of the piston body 210 with the compression bridge 225 therebetween. A pair of compression passages 230 spaced apart from each other with the compression bridge 225 therebetween form a group, and a plurality of pairs of compression passages 230 forming one group may be arranged on the piston body 210 at a certain angle.

In addition, the compression bridge 225 may be formed to protrude between two compression passages 230 and partition different passages.

Further, at least a portion of the compression bridge 225 may be in contact with the compression valve 500.

In addition, the piston 200 according to one embodiment of the present disclosure may further include a rebound auxiliary bridge 223, as shown in FIG. 2.

The rebound auxiliary bridge 223 may be formed between the plurality of rebound passages 220 formed on the other side of the piston body 210.

The rebound auxiliary bridge 223 may guide the inflow of fluid flowing into the rebound passage 220. Specifically, the rebound auxiliary bridge 223 may have one end connected to the first partition rib 221 and the other end connected to the side surface of the piston body 210. That is, in the inflow side of the rebound passage 220, by the first partition rib 221 and the rebound auxiliary bridge 223, fluid can be prevented from flowing into another rebound passage 220 neighboring the rebound auxiliary bridge 223.

In other words, the rebound auxiliary bridge 223 allows the fluid to flow evenly into the rebound passage 220 along the circumferential direction of the piston body 210.

In addition, the piston 200 of the shock absorber 101 according to one embodiment of the present disclosure may further include an inclined surface 237, as shown in FIG. 4.

The inclined surface 237 may be inclined so that the fluid passing through the rebound passage 220 effectively flows into the second piston chamber 234. Specifically, the inclined surface 237 formed in a region of the second piston chamber 234 connected to the rebound passage 220 may be inclined toward the rebound passage 220.

In addition, as shown in FIG. 5, the rebound valve 600 according to one embodiment of the present disclosure may include a first rebound disk 610, a second rebound disk 620, a backup disk 630, a preload disk. 640, a main disk 650, a sub-disk 600, a second retainer 670, and a rebound washer 680.

The first rebound disk 610 has a first disk passage 611 through which fluid can flow. Specifically, a plurality of the first disk passages 611 may be spaced apart from each other and extended through the first rebound disk 610. The first disk passage 611 may be formed along a part of a circle.

The second rebound disk 620 may have a second slit 621 and an expansion hole 622 through which fluid can flow. Specifically, the second slit 621 may be formed by depressing a region of the outer circumference of the second rebound disk 620 inwardly. In addition, the expansion hole 622 is formed to have a wider width than that of the second slit 621, and to communication with the second slit 621. Further, the expansion hole 622 may be disposed relatively closer to the center than the second slit 621.

That is, the fluid may form a damping force while moving along the first disk passage 610, the second slit 621, and the expansion hole 622. The second slit 621 and the expansion hole 622 may be orifices.

The backup disk 630 may be disposed below the second rebound disk 620. That is, the backup disk 630 may be spaced apart from the first rebound disk 610 with the second rebound disk 620 therebetween.

The preload disk 640 may have a height difference between an outer peripheral portion and a central portion thereof. A preload may be formed according to the pressures applied to the central portion and the outer peripheral portion of the preload disk 640 due to the height difference.

The main disk 650 is formed by stacking a plurality of disks to adjust a rigidity of the rebound valve 600. That is, damping of the shock absorber 101 may be adjusted by adjusting the rigidity of the rebound valve 600 by adjusting the number of the plurality of disks included in the main disk 650.

The sub-disk 660 is disposed below the main disk 650, and a plurality of disks may be stacked.

The second retainer 760 may have a relatively smaller outer diameter than the sub-disk 660.

The rebound washer 680 may be disposed below the second retainer 760. In addition, as shown in FIG. 8, the rebound valve 600 may be fitted onto one side of the piston rod 150, and may be fixed to the piston rod 150 through a bolt 700.

Specifically, the first rebound disk 610, the second rebound disk 620, the backup disk 630, the preload disk 640, the main disk 650, the sub-disk 660, and the second retainer 670 may respectively have at their centers installation holes 612, 623, 631, 641, 651, 661, and 671 through which one side of the piston rod 150 can pass.

Figure 6:
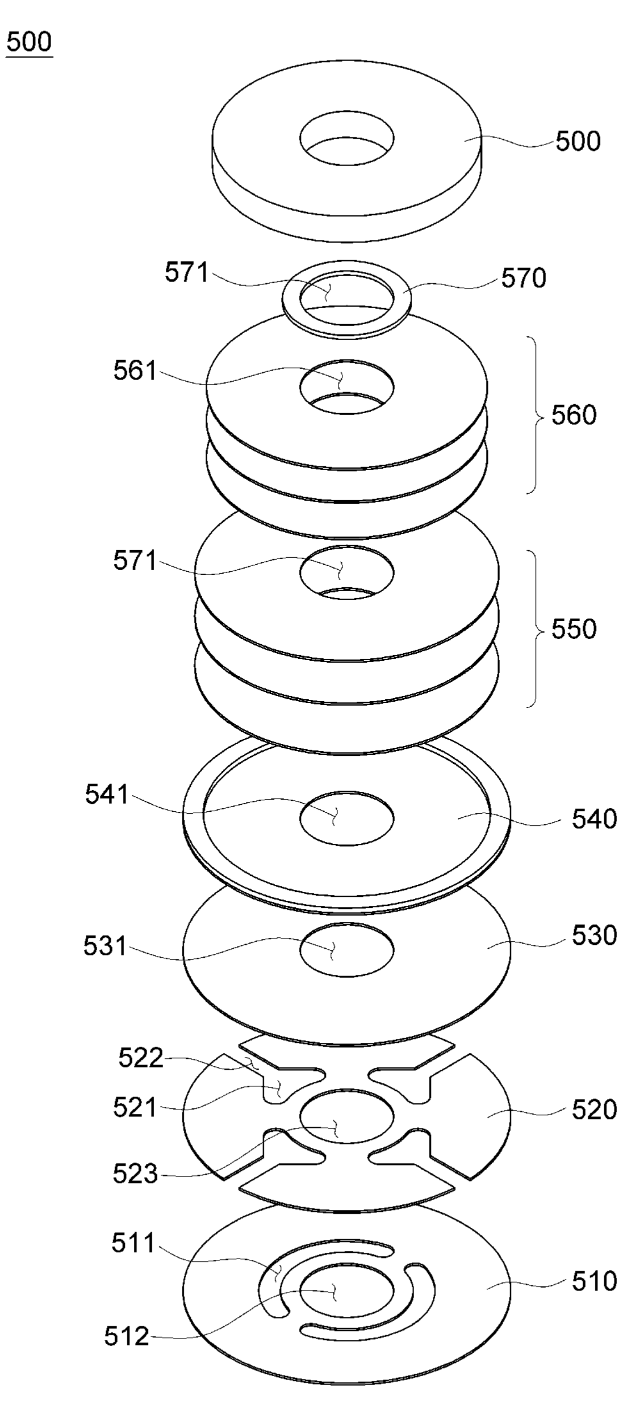
FIG. 6 is a view showing a compression valve according to one embodiment of the present disclosure.

In addition, as shown in FIG. 6, the compression valve 500 according to one embodiment of the present disclosure may include a first compression disk 510, a second compression disk 520, a backup disk 530, a preload disk 540, a main disk 550, a sub-disk 560, a third retainer 570, and a compression washer 580.

The first compression disk 510 has a first disk passage 511 through which fluid can flow. Specifically, a plurality of the first disk passages 511 may be spaced apart from each other and extended through the first compression disk 510. The first disk passage 511 may be formed along a part of a circle.

The second compression disk 520 may have a second slit 522 and an expansion hole 521 through which fluid can flow. Specifically, the second slit 522 may be formed by depressing a region of the outer circumference of the second compression disk 520 inwardly. In addition, the expansion hole 521 is formed to have a wider width than that of the second slit 522, and to communication with the second slit 522. Further, the expansion hole 521 may be disposed relatively closer to the center than the second slit 522.

That is, the fluid may form a damping force while moving along the first disk passage 510, the second slit 522, and the second enlarged diameter hole 521. The second slit 522 and the expansion hole 521 may be orifices.

The backup disk 530 may be disposed above the second compression disk 520. That is, the backup disk 530 may be spaced apart from the first compression disk 510 with the second compression disk 520 therebetween.

The preload disk 540 may have a height difference between an outer peripheral portion and a central portion thereof. A preload may be formed according to the pressures applied to the central portion and the outer peripheral portion of the preload disk 540 due to the height difference.

The main disk 550 is formed by stacking a plurality of disks to adjust a rigidity of the compression valve 500. That is, damping of the shock absorber 101 may be adjusted by adjusting the rigidity of the compression valve 500 by adjusting the number of the plurality of disks included in the main disk 550.

The sub-disk 560 is disposed above the main disk 550, and a plurality of disks may be stacked.

The third retainer 570 may have a relatively smaller outer diameter than the sub-disk 560.

The compression washer 580 may be disposed above the third retainer 570. In addition, as shown in FIG. 8, the compression valve 500 may be fitted onto one side of the piston rod 150 and may be fixed to the piston rod 150.

Specifically, the first compression disk 510, the second compression disk 520, the backup disk 530, the preload disk 540, the main disk 550, the sub-disk 560, and the third retainer 570 may respectively have at their centers the installation holes 512, 523, 531, 541, 551, 561, and 571 through which one side of the piston rod 150 can pass.

That is, the compression valve 500 and the rebound valve 600 have the same configuration and are disposed in opposite directions to be opened and closed by the fluid passing through the piston 200 to form a damping force.

Referring to FIGS. 1 to 11, a rebound operation process of the shock absorber 101 according to one embodiment of the present disclosure will be described.

Figure 7:
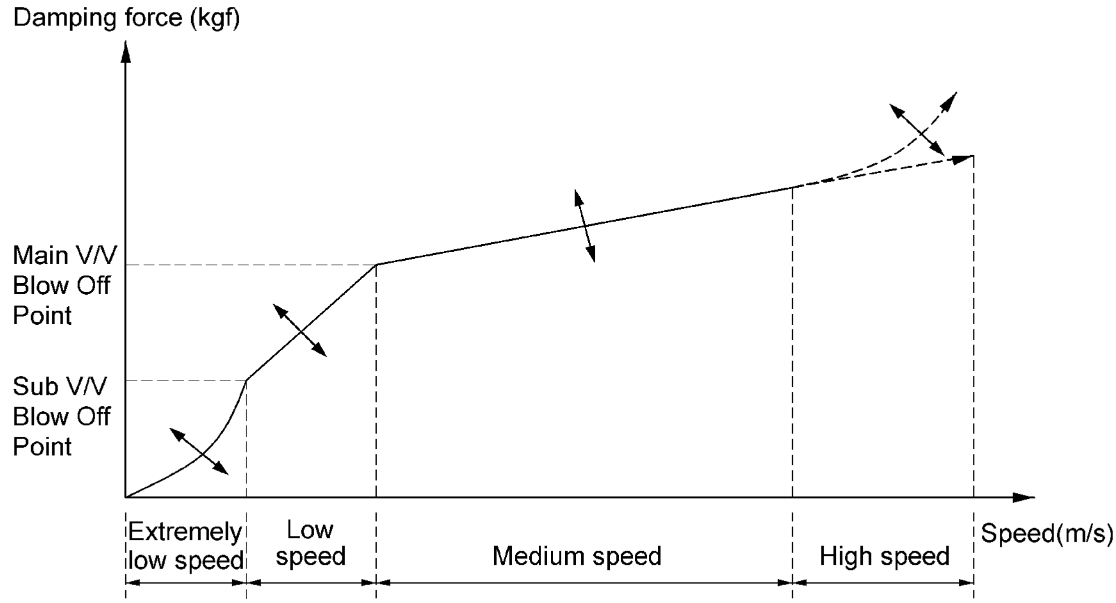
FIG. 7 shows a graph of a damping force depending on movement speed ranges of the piston during a rebound stroke of the piston according to one embodiment of the present disclosure.
Figure 10:
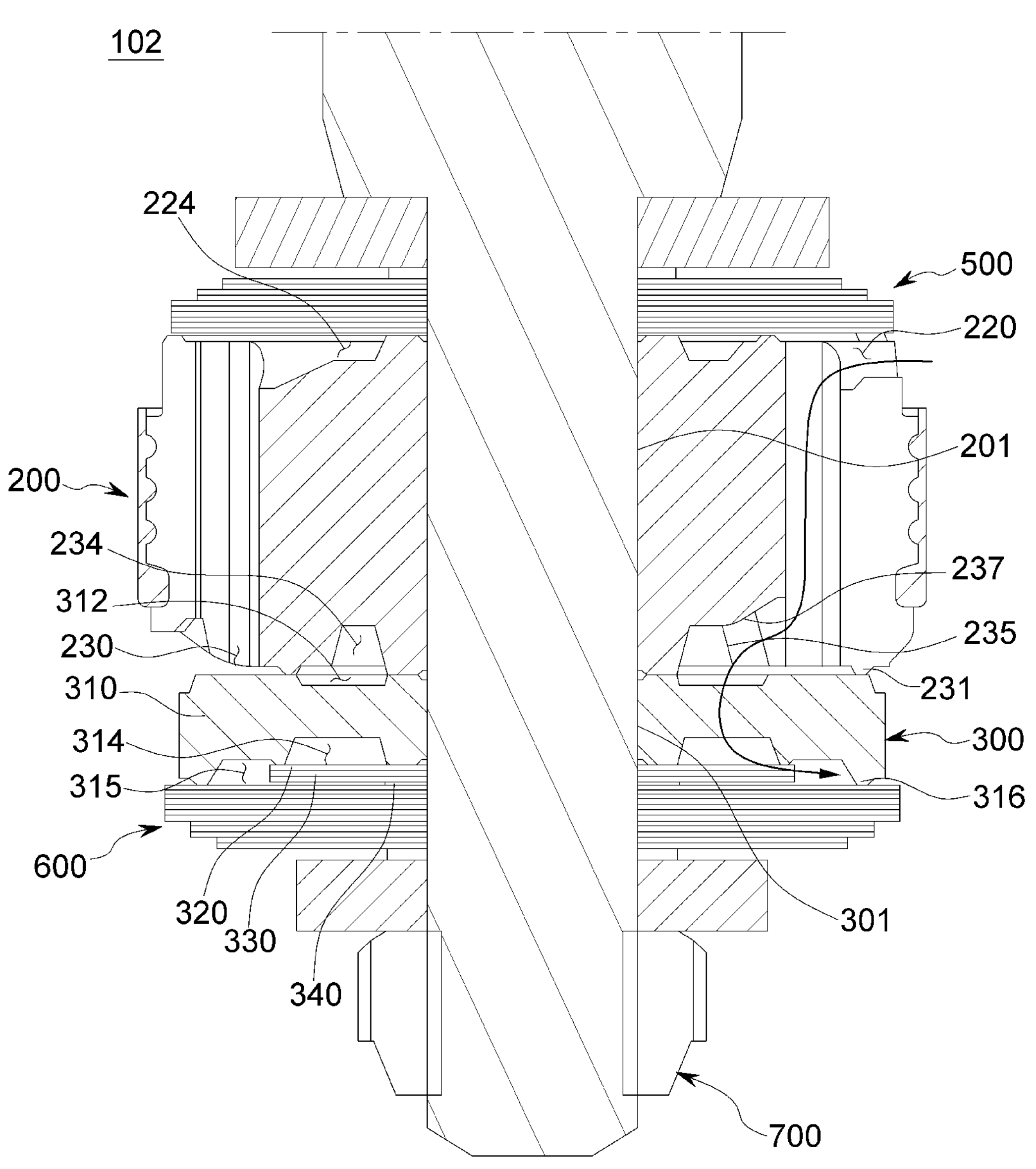
FIG. 10 is a diagram illustrating movement of fluid during the rebound stroke of the piston at an extremely low speed according to one embodiment of the present disclosure.

When the piston 200 moves at an extremely low speed in a direction in which the volume of the rebound chamber 110 decreases, as shown in FIGS. 7 and 10, the fluid remaining in the rebound chamber 110 flows through the rebound passage 220 into the second piston chamber 234. Then, the fluid flows into the first rebound retainer chamber 312 after passing through the second piston chamber 234.

The fluid is moved to the second rebound retainer chamber 314 through the retainer hole 313 formed in the first rebound retainer chamber 312.

Further, the fluid is stored in the second rebound retainer chamber 314, and the fluid in the second rebound retainer chamber 314 passes through the slit 322 of the first disk 320 to form a damping force. That is, the fluid stored in the second rebound retainer chamber 314 passes through the narrow slit 322 of the first disk 320 to form a damping force.

That is, depending on the area of the slit 322, a damping force is formed when the piston 200 moves at an extremely low speed, as shown in FIG. 7.

When manufacturing the shock absorber 101, by assembling the first disk 320 having a different area of the slit 322, the damping force of the shock absorber 101 at an extremely low speed can be adjusted to increase or decrease.

Referring to FIG. 7, Sub V/V Blow Off Point is a point at which the fluid stored in the second rebound retainer chamber 314 forms a damping force while passing through the narrow slit 322 of the first disk 320.

When the piston 200 moves at a low speed in a direction in which the volume of the rebound chamber 110 decreases, as shown in FIGS. 9 and 10, the fluid passing through the slit 322 can move into the third rebound retainer chamber 315. Further, the fluid moved to the third rebound retainer chamber 315 may pass through the first disk passage 611 formed in the first rebound disk 610 and the orifice formed in the second rebound disk 620. Then, a damping force is formed by the pressure of the fluid passing through the first disk passage 611 and the orifice.

That is, when the piston 200 performs the rebound stroke at a low speed, the damping force can be adjusted by the thickness of the second disk 330.

Referring to FIG. 7, Main V/V Blow Off Point is a point at which the fluid moved to the third rebound retainer chamber 315 forms a damping force while passing through the orifice formed in the second rebound disk 620.

When the piston 200 moves at a medium speed in a direction in which the volume of the rebound chamber 110 decreases, as shown in FIGS. 5 and 8, the fluid passing through the orifice opens the preload disk 640, the main disk 650, and the sub-disk 660.

That is, when the piston 200 performs the rebound stroke at the medium speed, the damping force can be adjusted by the thickness of the main disk 650 and the height difference between the rebound retainer 310 and the preload disk 640.

Figure 11:
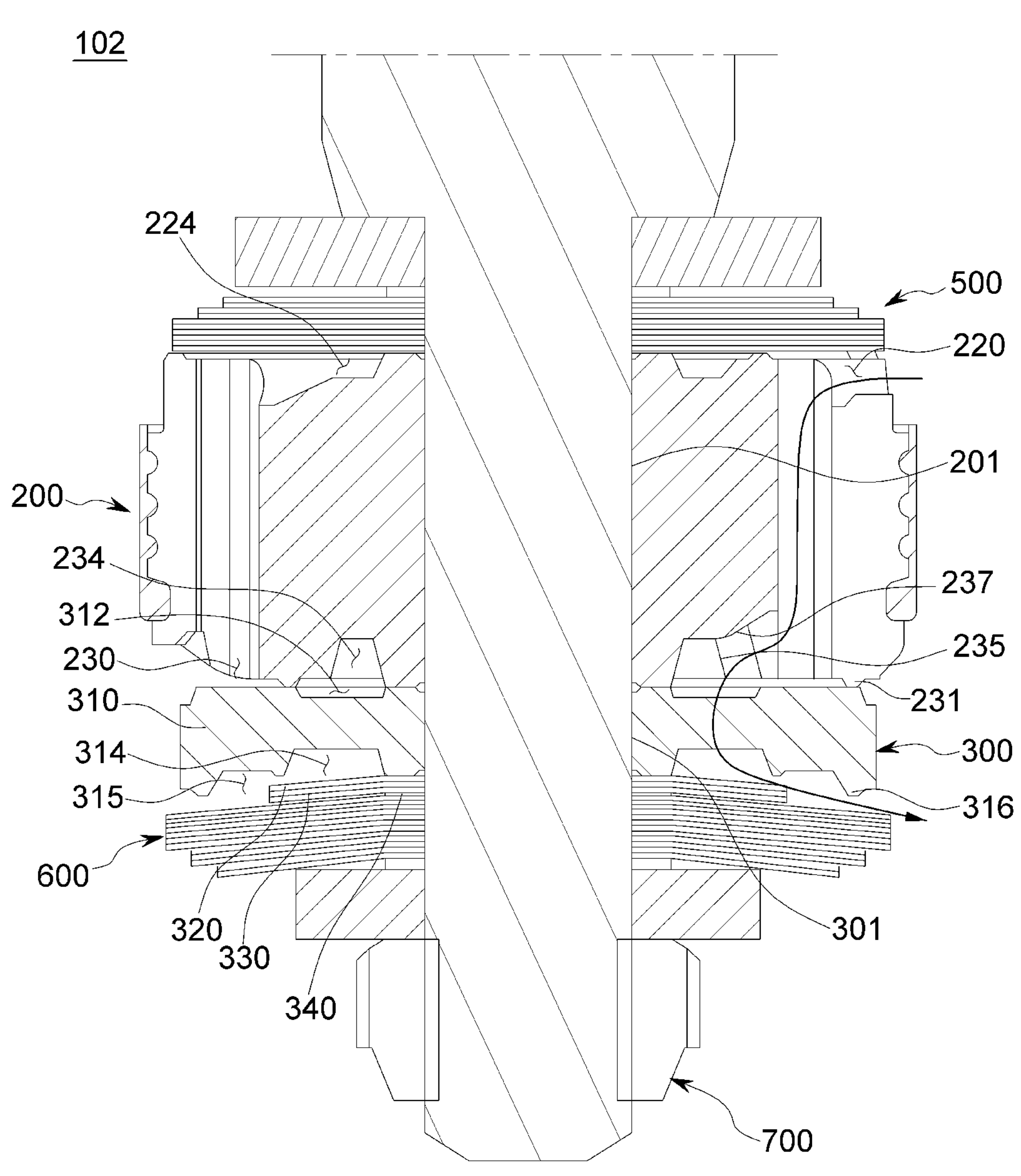
FIG. 11 is a diagram showing movement of fluid during the rebound stroke of the piston at a high speed according to one embodiment of the present disclosure.

When the piston 200 moves at a high speed in a direction in which the volume of the rebound chamber 110 decreases, as shown in FIGS. 7 and 11, the fluid moved to the second rebound retainer chamber 314 through the retainer hole 313 can moved in a state where both the first disk 320 and the rebound valve 600 are opened. That is, when the piston 200 performs the rebound stroke at the high speed, the area where the retainer hole 313 is formed may act as a variable for the damping force.

As the speed of the piston 200 performing the rebound stroke increases, the opening angle of the rebound valve 600 increases due to the pressure and resistance of the fluid therein.

Accordingly, when the piston 200 performs the rebound stroke in a direction in which the volume of the rebound chamber 110 decreases, the shock absorber 101 can be manufactured by changing the detailed configuration of the valve device 102 according to the moving speed of the piston 200 to vary the damping force required by a vehicle or driver.

With such configurations, the shock absorber 101 according to one embodiment of the present disclosure can adjust the damping force of the shock absorber 101 when the piston 200 performs the rebound stroke at an extremely low speed or a high speed.

Specifically, by adjusting the area of the slit 322 of the damping force adjusting unit 300 or the diameter of the retainer hole 313 when assembling the shock absorber 101, it is possible to manufacture the shock absorber 101 having a different damping force during the rebound stroke at an extremely low speed or a high speed of the piston 200.

That is, in the shock absorber 101 according to one embodiment of the present disclosure, the degree of freedom in tuning the damping force depending on the movement speed of the piston 200 can be increased.

Although the embodiments of the present disclosure have been described with reference to the accompanying drawings, those skilled in the art to which the present disclosure pertains may understand that the present disclosure can be implemented in other specific forms without changing the technical idea or essential features of the present disclosure.

Therefore, the embodiments described above should be understood as illustrative in all respects and not limiting, and it should be understood that the scope of the present disclosure is indicated by the following claims, and the meaning and scope of the claims, and all changes or modification derived from the equivalent concept are construed as being included in the scope of the present disclosure.

DESCRIPTION OF REFERENCE NUMERALS

100: body
101: shock absorber
102: valve device
110: rebound chamber
120: compression chamber
200: piston
210: piston body
220: rebound passage
224: first piston chamber
230: compression passage
234: second piston chamber
235: rebound bridge
300: damping force adjusting unit
310: rebound retainer
312: first rebound retainer chamber
313: retainer hole
314: second rebound retainer chamber
315: third rebound retainer chamber
316: third protrusion
317: second protrusion
318: first protrusion
320: first disk
322: slit
330: second disk
340: retainer
500: compression valve
600: rebound valve

What is claimed is:

1. A shock absorber comprising:

a body in which fluid is stored;

a piston disposed inside the body to form a compression chamber on one side and a rebound chamber on the other side, and having a rebound passage and a compression passage through which the compression chamber and the rebound chamber communicate with each other;

a damping force adjusting unit, disposed on one side of the piston, for adjusting a damping force of the fluid passing through the rebound passage;

a rebound valve that contacts at least a portion of the damping force adjusting unit, the rebound valve being opened and closed by a pressure of the fluid passing through the rebound passage to form a damping force; and a compression valve disposed on the other side of the piston, the compression valve being opened and closed by a pressure of the fluid passing through the compression passage to form a damping force, wherein the piston includes:

a first piston chamber formed to store the fluid passing through the compression passage in a region facing the compression valve on the other side of the piston; and a second piston chamber formed to store the fluid passing through the rebound passage in a region facing the damping force adjusting unit on one side of the piston, the second piston chamber having a larger volume than that of the first piston chamber.

2. The shock absorber of claim 1, wherein the damping force adjusting unit includes:

a rebound retainer including a first rebound retainer chamber disposed on one side of the piston and formed concavely in an annular shape to store a part of the fluid passing through the second piston chamber, and a retainer hole formed in the first rebound retainer chamber.

3. The shock absorber of claim 2, wherein the damping force adjusting unit further includes:

a first disk for guiding the fluid passing through the retainer hole to move to a slit formed in an outer circumferential surface of the first disk.

4. The shock absorber of claim 3, wherein the rebound retainer further includes:

a first protrusion that contacts a portion of the first disk adjacent to a central portion of the first disk;

a second protrusion that contacts a portion of an outer peripheral portion of the first disk;

a second rebound retainer chamber concavely formed between the first protrusion and the second protrusion and communicating with the retainer hole;

a third rebound retainer chamber in which fluid passing through the slit is stored; and a third protrusion that protrudes to contact a portion of the rebound valve on one side of the third rebound retainer chamber.

5. The shock absorber of claim 4, wherein the damping force adjusting unit further includes:

a second disk for guiding the fluid passing through the slit to move to the third rebound retainer chamber; and a retainer disposed between the second disk and the rebound valve.

6. The shock absorber of claim 5, wherein the first disk, the second disk, and the retainer are disposed between the first protrusion and the third protrusion.

7. The shock absorber of claim 3, wherein the first disk and the rebound retainer adjust damping forces in different speed ranges depending on a moving speed of the piston.

8. The shock absorber of claim 2, wherein the rebound passage of the piston includes a plurality of rebound passages, and wherein the piston further includes a rebound bridge that is formed between the plurality of rebound passages, is inclined toward a center of the piston, at least partially faces the first rebound retainer chamber, and forms a part of the second piston chamber.

9. The shock absorber of claim 2, wherein a region of the second piston chamber communicating with the rebound passage is inclined so that the fluid passing through the rebound passage flows into the second piston chamber.

10. A valve device for controlling a damping force, which is disposed, on one side of a piston having a passage through which fluid moves, inside a shock absorber, the valve device comprising:

a rebound retainer disposed on the one side of the piston and including a first rebound retainer chamber concavely formed in an annular shape to allow a portion of fluid passing through the passage to be stored, and a retainer hole formed in the first rebound retainer chamber; and a first disk for guiding fluid passing through the retainer hole to move through a slit formed in an outer circumferential surface thereof, wherein the rebound retainer further includes:

a first protrusion that contacts a portion of the first disk adjacent to a central portion of the first disk;

a second protrusion that contacts a portion of an outer peripheral portion of the first disk;

a second rebound retainer chamber concavely formed between the first protrusion and the second protrusion and communicating with the retainer hole; and a third rebound retainer chamber, for storing fluid passing through the slit, spaced apart from the second rebound retainer chamber around the second protrusion.

11. The valve device of claim 10, further comprising:

a second disk for guiding fluid stored in the second rebound retainer chamber to move to the third rebound retainer chamber.

12. The valve device of claim 11, further comprising:

a rebound valve that is opened and closed by a pressure of the fluid passing through the passage to form a damping force.

13. The valve device of claim 10, wherein the second protrusion is formed to have a larger length in a direction away from the piston than the first protrusion.

14. The valve device of claim 10, further comprising a rebound valve, wherein the rebound retainer further includes a third protrusion that protrudes to contact a portion of the rebound valve on one side of the third rebound retainer chamber.

15. The valve device of claim 10, wherein during a rebound stroke of the piston, the fluid passing through the retainer hole forms a damping force while passing between the rebound retainer and the first disk.

16. The valve device of claim 10, wherein during a rebound stroke of the piston, the fluid passing through the retainer hole forms a damping force while passing through the slit.

17. A valve device for controlling a damping force, which is disposed, on one side of a piston having a passage through which fluid moves, inside a shock absorber, the valve device comprising:

a rebound retainer disposed on the one side of the piston and including a first rebound retainer chamber concavely formed in an annular shape to allow a portion of fluid passing through the passage to be stored, and a retainer hole formed in the first rebound retainer chamber; and a first disk for guiding fluid passing through the retainer hole to move through a slit formed in an outer circumferential surface thereof, wherein the rebound retainer further includes:

a first protrusion that contacts a portion of the first disk adjacent to a central portion of the first disk; and a second protrusion that contacts a portion of an outer peripheral portion of the first disk, wherein the second protrusion is formed to have a larger length in a direction away from the piston than the first protrusion.

18. The valve device of claim 17, wherein the rebound retainer further includes:

a second rebound retainer chamber concavely formed between the first protrusion and the second protrusion and communicating with the retainer hole.

19. The valve device of claim 18, further comprising a rebound valve, wherein the rebound retainer further includes a third rebound retainer chamber, for storing fluid passing through the slit, spaced apart from the second rebound retainer chamber around the second protrusion; and a third protrusion that protrudes to contact a portion of the rebound valve on one side of the third rebound retainer chamber.

20. The valve device of claim 19, further comprising a second disk for guiding fluid stored in the second rebound retainer chamber to move to the third rebound retainer chamber, wherein the rebound valve is opened and closed by a pressure of the fluid passing through the passage to form a damping force.

* * * * *